US 6,720,966 B2

(12) United States Patent
Barth et al.

(10) Patent No.: US 6,720,966 B2
(45) Date of Patent: Apr. 13, 2004

(54) METHOD FOR RECONSTRUCTING 3D IMAGE DATA WITH RESPECT TO A VOLUME OF INTEREST OF AN EXAMINATION SUBJECT

(75) Inventors: Karl Barth, Hoechstadt (DE); Thomas Brunner, Nuremberg (DE); Matthias Mitschke, Nuremberg (DE); Karl Wiesent, Erlangen (DE)

(73) Assignee: Siemens Aktiengesellschaft, Münich (DE)

( * ) Notice: Subject to any disclaimer, the term of this patent is extended or adjusted under 35 U.S.C. 154(b) by 376 days.

(21) Appl. No.: 09/742,117

(22) Filed: Dec. 22, 2000

(65) Prior Publication Data

US 2003/0052879 A1 Mar. 20, 2003

(30) Foreign Application Priority Data

Dec. 23, 1999 (DE) .......................... 199 62 666

(51) Int. Cl.[7] ............................... G06T 17/00
(52) U.S. Cl. .................. 345/424; 250/363.04; 600/436; 378/21; 378/62
(58) Field of Search .................... 345/424; 250/363.04; 600/436; 378/21, 62

(56) References Cited

U.S. PATENT DOCUMENTS 5,552,605 A * 9/1996 Arata ..................... 250/363.04

FOREIGN PATENT DOCUMENTS

DE 198 16 353 10/1999

OTHER PUBLICATIONS

Editing Tools for 3D Medical Imaging, Ney et al., IEEE Computer Graphics & Applications, Nov. 1991, pp. 63–72.
"Digitale 3D–Angiographie," Barfuss, Das Digitale Krankenhaus, vol. 54 (1998) pp. 19–22.
"3D Rotational Angiography: Clinical Value in Endovascular Treatment," Moret et al., Medica Mundi, vol. 42, No. 3 (1998) pp. 8–14.
"3D–Rotational Angiography, First Clinical Application with Use of a Standard Philips C–arm System," Kemkers et al., CAR'98, Lemke et al., Ed. (1998) pp. 182–187.
"3D Reconstruction from Projection Matrices in a C–arm Based 3D–Angiography System," Navab et al., Medical Image Computing and Computer–Assisted Intervention—MICCAI '98, Wells et al., Ed. (1998), pp. 119–129.

* cited by examiner

Primary Examiner—Mark Zimmerman
Assistant Examiner—Lance W. Sealey
(74) Attorney, Agent, or Firm—Schiff Hardin LLP

(57) ABSTRACT

In a method for reconstructing 3D image data, a number of 2D central projections from different projection directions is acquired with a planar detector and radiation emanating from a radiation source, and a volume of interest of an examination subject to be three-dimensionally reconstructed is identified by mixing in variable and mutually dependent marks into at least two 2D central projections.

10 Claims, 5 Drawing Sheets

$$\frac{r}{r'} = \frac{d}{t'}$$
$$t' = \sqrt{d^2 + r^2}$$

$$\frac{r'}{r} = \frac{d}{t}$$
$$t = \sqrt{d^2 - r^2}$$

METHOD FOR RECONSTRUCTING 3D IMAGE DATA WITH RESPECT TO A VOLUME OF INTEREST OF AN EXAMINATION SUBJECT

BACKGROUND OF THE INVENTION

1. Field of the Invention

The present invention is directed to a method for reconstructing 3D image data for a volume of interest of an examination subject, wherein radiation emanating from a radiation source is received with a planar detector, of the type wherein a number of 2D central projections are acquired from different projection directions, a volume of interest is marked, and 3D image data of the volume of interest corresponding to the markings are reconstructed from the 2D central projections.

2. Description of the Prior Art

In the current state of computer technology, reconstructive 3D imaging represents has widespread use. This is particularly true for medical-diagnostic imaging, for example computed tomography (CT), magnetic resonance tomography, nuclear medicine, ultrasound and, recently, 3D x-ray technology. These methods are also utilized, outside medical technology in general technology such as, for example, computer tomography for the non-destructive testing of materials (motor blocks in the automotive industry, drill cores in the petroleum industry, etc.).

The term "reconstructive imaging" means that the measured data supplied by the respective detectors are not directly interpreted, but are used as inputs in a procedure that supplies qualitatively new image information, i.e. image data. The mathematical algorithms utilized for this purpose make high demands on the computers employed for the processing of these algorithms with respect to the computing power and data volume.

An important structural feature CT apparatus is a mechanically stable, usually annular gantry that allows substantially vibration-free revolutions of the entire measuring system in the sub-second range. A disadvantage of such a CT apparatus is the limited accessibility to the patient for medical personnel, for example a physician, as a consequence of the gantry. Better accessibility would be desirable for the more frequently utilized minimally invasive and endoscopic surgical techniques (interventions) with additional 3D imaging.

One technique in this direction is the reconstruction of 3D image data from a series of 2D central projections acquired in the form of standard x-ray exposures with a C-arm apparatus that is conventional in terms of its mechanical structure, whereby a planar detector, for example an x-ray image intensifier or, recently, a semiconductor panel is utilized as the radiation receiver.

For example, neuro-radiology is field of employment for such a technique. Vessels filled with contrast agent and their spatial position are imaged with high topical resolution. This is required, for example, in the neuro-surgical treatment of aneurisms. Interventions of this type ensue under constant x-ray monitoring.

The technical realization of the 3D functionality ensues by acquiring the digital data corresponding to the 2D central projections in the course of rotation angiography. For example, a C-arm apparatus distributed by Siemens AG under the name NEUROSTAR® is suitable as a registration device. Typically, 50 2D central projections having 1024× 1024 pixels each are registered in five seconds over an angular range of 200°. Due to the mechanical instability of the C-arm, the exact projection geometry must be defined for each of the 2D central projections and must then be taken into consideration in the implementation of the reconstruction algorithm. The reconstruction of the 3D image data ensues according to CT principles.

A C-arm apparatus of this type is described in detail in H. Barfuss, Digitale 3D-Angiographie, VDE-Fachbericht, Vol. 34: Das Digitale Krankenhaus, VDE-Verlag, 1998.

In rotation angiography as a recent 3D imaging method, the preconditions compared to computed tomography are essentially modified by the following points:

A mechanically unstable system with a freely rotatable C-arm is utilized.

The objective is interventional employment, i.e. the image result, must be quickly available during the examination or treatment.

The "field of vision" of the detector, i.e. the aperture angle of the cone-shaped or pyramidal x-ray beam emanating from the x-ray source, is limited compared to computed tomography.

The following facts follow from these points:

1. The entire body is usually not registered, but only a part thereof. This defines a maximum reconstructable volume (MRV).
2. The maximally obtainable spatial resolution of the portrayed volume is limited by the resolution of the 2D central projections; the resolution available to the observer is additionally limited by the selected size of the voxels (voxel=volume element).
3. The number of voxels enters critically into the calculation time. A halving of the size of the voxels with retention of the size of the volume to be reconstructed means, for example, an eight-times increase in the number of voxels and also means an eight-times increase in the size of the dataset. Given limited calculating time (for reconstruction and display), a larger volume with poorer spatial resolution, or a smaller volume with high-spatial resolution (limited by the resolution of the 2D projections) therefore can be reconstructed with a given calculating power.
4. During the implementation of an intervention (for example, placement of platinum coils), the physician is interested in obtaining optimally high resolution, local 3D information with respect to a volume of interest (VOI=volume of interest) within the MRV.

Given employment of rectangular surface detectors, the MRV can be considered approximately as a circular cylinder around the rotational axis of the C-arm in an approximation, as shown in FIG. 3 herein.

The selection of the volume to be reconstructed based on this approximation is described in detail below.

The definition of the volume within the MRV from which 3D image data are to be reconstructed ensues on the basis of numerical coordinates, usually in a global coordinate system that is preferably oriented with respect to the geometry of the apparatus. For example, the rotational axis of the C-arm corresponds to the z-axis, the rotational plane corresponds to the xy-plane and the x-axis proceeds parallel to the patient support.

The selected volume is geometrically considered as a cuboid, composed of many small cuboids of the same size, i.e., the voxels. The reconstruction allocates a gray scale value to each voxel, this corresponding to the x-ray attenuation coefficient (approximate density) of the subject in the region of the voxel. The reconstructed 3D image data therefore represent a scalar 3D field f (i, j, k), with
i=1, ..., Nx,
j=1, ..., Ny,
k=1, ..., Nz,
where Nx, Ny, Nz reference the number of voxels which are present in the direction of the respective coordinate axis.

The mid-point of each voxel has a geometrical position (xi, yj, zk) allocated to it. When the edge lengths of a voxel are referenced dx, dy, dz, then, for example, the following applies:

$$xi = x0 + i*dx,$$

$$yj = y0 + j*dy,$$

$$zk = z0 + k*dz$$

The reference point (x0, y0, z0) describes the hypothetical voxel that lies outside the cuboid on the spatial diagonal thereof and touches it. Of course, other reference points are possible, for example the mid-point of the cuboid (xM, yM, zM).

N=Nx*Ny*Nz is the overall number of voxels. This number N critically defines the required calculating time. The quantities X=Nx*dx, Y=Ny*dy and Z=Nz*dz describe the edge lengths of the cuboid, i.e. the illustrated overall volume. The quantities dx, dy, dz define the topical resolution of the reconstructed 3D dataset.

Given a constant N, i.e. a given calculating time, one can thus construct either a large volume with poor resolution or a small VOI with good resolution. For evaluating diagnostically or therapeutically relevant structures, for example an aneurism, the latter is preferred. A problem is having to indicate the position of the VOI in the space for a particular examination situation, for which abstract positional coordinates (reference point) are less helpful since these, unfortunately, have no direct reference to the examination subject, i.e. the patient.

To address this problem, it is known to proceed as described in J. Moret et al., 3D rotational angiography: Clinical value in endovascular treatment, Medica Mundi, Vol. 42, no. 3, 1998, oder bei R. Kemkers et al., 3D-Rotational Angiography: First clinical application with use of a standard Philips C-arm system, CAR'98, edited by H. U. Lemke et al., Elsevier Science B.V., 1998. As described therein, only after a reconstructed MRV with reduced resolution is produced are artificial orthogonal projections generated therefrom, for example parallel beam MIPs (MIP=maximum intensity projection) wherein the VOI can then be defined.

Such a procedure is complicated and time-consuming.

SUMMARY OF THE INVENTION

It is an object of the invention to provide a method of the type initially described wherein the VOI can be defined in a simple and time-saving way.

This object is inventively in a method for reconstructing 3D image data for a volume of interest of an examination subject, wherein radiation emanating from a radiation source is received with a planar detector, and wherein a number of 2D central projections are acquired from different projection directions, at least two 2D central projections from the 2D central projections are displayed, the contour of the volume of interest is marked in a first, displayed 2D central projection(s) and a corresponding marking is mixed into the first, display 2D central projection(s), a marking is mixed into the other displayed 2D central projection(s) that show the contour(s) corresponding to the mark mixed into the first 2D central projection(s), and 3D image data of the volume of interest containing the marks are reconstructed from the 2D central projection(s).

The inventive method thus allows the selection of a VOI in an easy, dependable and fast way, without the time-consuming intervening step of reconstructing the MRV in reduced resolution and without the determination of parallel beam MIPs, since the inventive procedure allows the interactive selection of a VOI directly from measured 2D central projections that must be available anyway for the reconstruction of the 3D image data. The images with reference to which the selection of the VOI ensues are conventional x-ray exposures in central-perspective imaging.

In the limit case, stereoscopic image pairs can be used in the selection of 2D central projection serving as a VOI. As a rule, the projection directions of the 2D central projections will reside substantially orthogonally relative to one another. Angles between the projection directions that lie between 0° and 90° or are greater then 90° are also possible, whereby— in the orthogonal case—a more precise position and size determination is possible. Even though two 2D central projections would suffice in most instances in order to select a VOI, the possibility also exists within the scope of the invention to display more than two 2D central projections for the selection of the VOI and to mix corresponding markings into these displays.

When employing a C-arm apparatus, the mechanical instability thereof leads to irregularly positioned exposure positions of the individual 2D central projections; however, the individual exposure positions are at least fundamentally known. They are taken into consideration not only in the reconstruction algorithm in the determination of the 3D image data but also in the selection of the VOI. An advantageous method for describing the projection geometry is the employment of homogeneous coordinates. A central projection is thereby completely described by a 3×4 matrix P. When this matrix is applied to a point of the 3D space, then, after re-normalization, the 2D detector coordinates (see u and v according to FIG. 4) of the picture element are directly obtained. (See N. Navab et al., 3D Reconstruction from Projection Matrices in a C-Arm based 3D-Angiography System, Medical Image Computing and Computer-Assisted Intervention-MICCAI'98, edited by W. M. Wells et al., Springer, 1998.)

In a preferred embodiment of the invention the marks are modified as required before the reconstruction of 3D image data, whereby given modification of the marks mixed into a displayed 2D central projection, the mark(s) mixed into the other displayed projection (s) is (are) correspondingly adapted. There is thus the possibility of interactively optimizing the selection of the volume of interest in a number of steps, and modifications of the marking undertaken in one of the 2D central projections can be immediately recognized in terms of their effect in the other, displayed 2D central projections.

The time that is required for the reconstruction of the 3D image data for a volume of interest can be further reduced in a version of the invention wherein only those data subsets that are absolutely necessary for the reconstruction of 3D image data of the volume of interest corresponding to the markings are taken into consideration in the reconstruction of 3D image data for the volume of interest corresponding to the marks, namely from the data corresponding to the individual 2D central projections. This is advantageous particularly given interventional utilization of the inventive method, since it is important in such procedures to obtain a diagnostic answer as quickly as possible in the form of high-resolution 3D image data for the volume of interest corresponding to the marks.

In order to obtain further information with respect to the selected volume of interest, in an embodiment of the invention arbitrary, further 2D central projections can be selected into which marks corresponding to the contour of the volume of interest are mixed. There is also the possibility of mixing marks corresponding to the contour of the volume of interest into all 2D central projections. This affords the possibility to check the selected volume of interest, by successively viewing the 2D central projections provided with marks such as by scrolling. Alternatively, there is the possibility in another version of the invention to display all 2D central projections into which a mark is mixed in the form of a cine replay, i.e. successively in the fashion of a movie film, with mixed-in markings.

In another embodiment of the invention, substantially rectangular markings are mixed into the 2D central projections, since this can be realized with little calculating outlay. The mark can be a reticule in order to identify the center of the selected volume of interest, and the reticule lines of the reticule can be interrupted in a central region in order to prevent the diagnostically relevant structures from being covered by the reticule lines.

DESCRIPTION OF THE PREFERRED EMBODIMENTS

Figure 1:
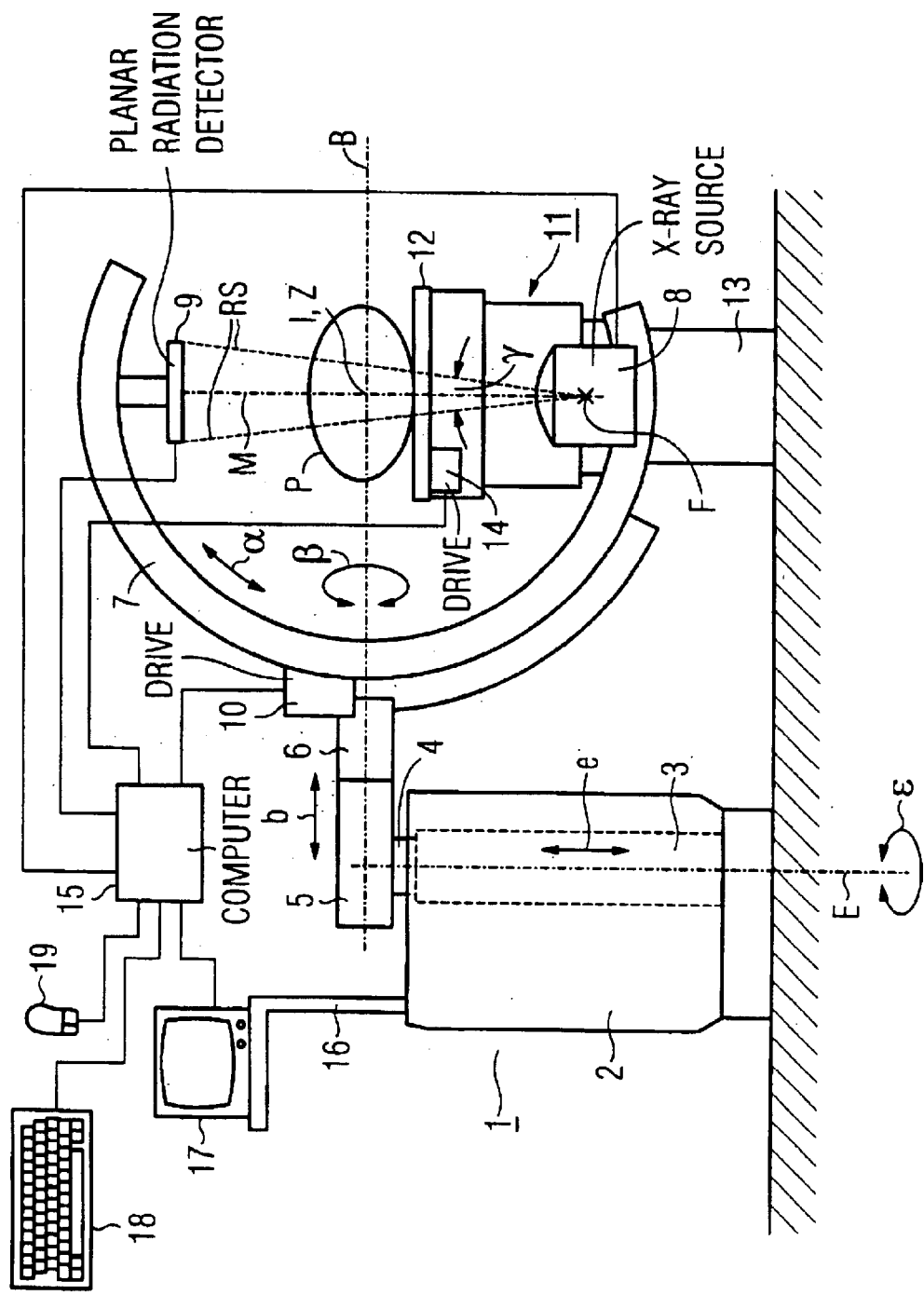
FIG. 1 is a front view of an x-ray diagnostic apparatus suitable for implementation of the inventive method.
Figure 2:
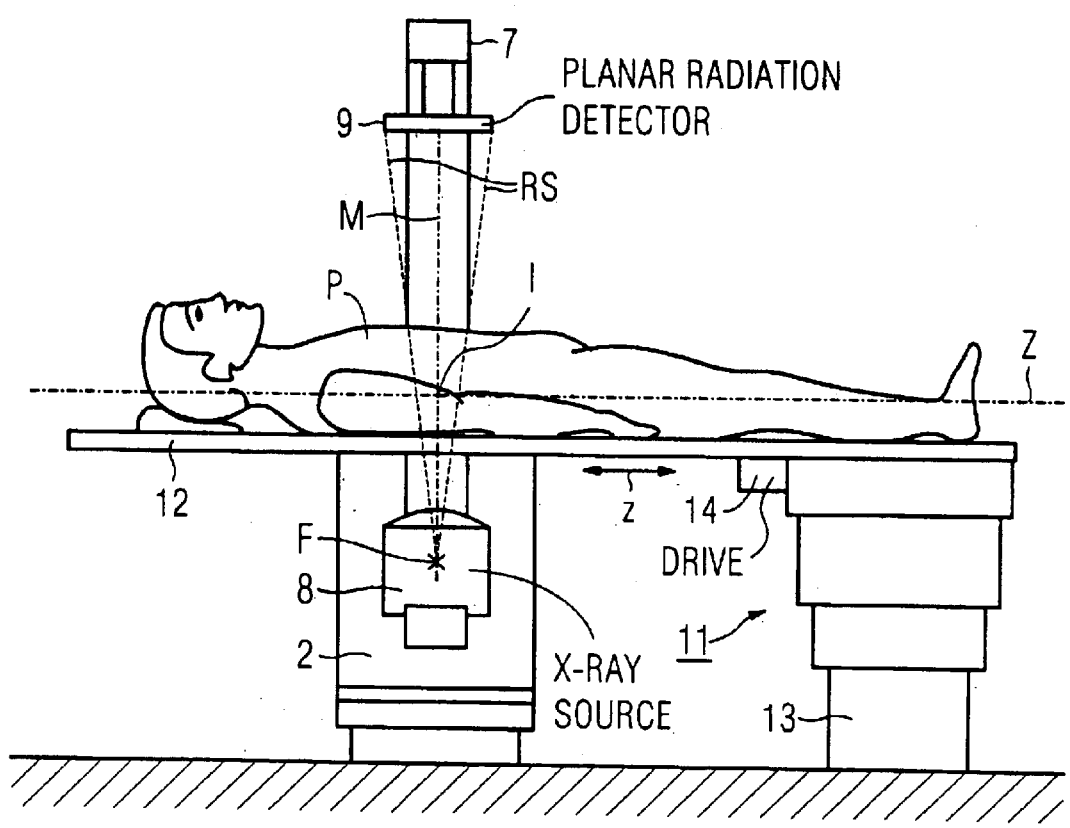
FIG. 2 is a side view of the x-ray diagnostic apparatus according to FIG. 1.

FIGS. 1 and 2 show an x-ray diagnostic apparatus 1 that is suitable for implementation of the inventive method. The apparatus 1 has a base 2 to which a column 4 with a longitudinal axis E is attached in height-adjustable fashion in the direction of the double arrow e, with a lifting mechanism 3 that is schematically indicated in FIG. 1. The column 4 is seated rotatable around its longitudinal axis E in the direction of the double arrow ε.

A holder 5 is arranged at the column 5, to which a support 6 is attached to the holder 5 for supporting a carrier that has a curved C-shape, and thus is open and adjustable around an isocenter I as described below. The carrier is referred to below as a C-arm 7.

An x-ray source 8 and a detector 9 are mounted opposite each other at the C-arm 7, such that a center ray M of an x-ray beam emanating from a focus F of the x-ray source 8, and indicated by edge rays RS shown dashed in FIGS. 1 and 2, strikes the detector 9 approximately centrally. The central ray M proceeds through the isocenter I. The detector 9 is a planar detector, for example an x-ray image intensifier or, as in the illustrated exemplary embodiment, a flat image detector formed by a semiconductor panel. A flat image detector has a number of detector elements (not shown in the figures) arranged in a matrix in, for example, orthogonal detector rows and columns that form a rectangular detector surface. The detector 9 is arranged at the C-arm 7 relative to the x-radiator 8 so that, given ideal geometry, the central ray M is at a right angle relative to the detector plane, and the detector columns according to FIG. 4 proceed parallel to a system axis Z proceeding through the isocenter I in the direction of the v-axis of a rectangular coordinate system referenced to the detector 9 that has this v-axis and a u-axis.

In a known way, the C-arm 7, mounted at the support 6 so as to be adjustable around the isocenter I, and thus around the system axis Z, as the rotational axis of the C-arm 7, in the direction of the double arrow α along its circumference. This displacement takes place with a drive 10 that is only schematically shown. The system axis Z is perpendicular to the plane of the drawing of FIG. 1, and thus perpendicular to the plane in which the focus of the x-ray source 8 moves given adjustment of the C-arm 7 in the α direction. The drive 10, for example, contains an electric motor and a transmission coupling it to the C-arm.

Together with the support 6, the C-arm 7 is rotatable in the direction of the curved double arrow β in a known way around a common axis B of the holder 5 and the support 6 that proceeds through the isocenter I and at a right angle to the system axis Z. The C-arm 7 is mounted at the holder 5 to be displayed along the axis B according to the double arrow b parallel to the x-axis of a rectangular, spatial coordinate system entered in FIG. 5 and referred to below as a global coordinate system, the origin O thereof lying in the isocenter I, and thus at the intersection of the system axis Z and the central ray M.

A positioning arrangement 11 is provided for an examination subject, for example a patient P, to be examined with the x-ray diagnostic apparatus 1. This positioning arrangement 11 has a plate 12 for the patient P that is attached to a base 13 that is adjustable in the direction of its longitudinal axis with a drive 14, as illustrated by a double arrow z.

The inventive x-ray diagnostic apparatus 1 makes it possible to scan a volume of the patient P by registering two-dimensional projections from different projection angles α, are a computer 15 reconstructs three-dimensional image information for the scanned volume of the patient P from the measured data corresponding to the registered projections, i.e. output signals of the detector 9 covering one measured value per detector element for each projection. The image information, for example can be displayed in the form of tomograms on a monitor 17 connected to the computer 15. A keyboard 18 and a mouse 19 are also connected to the computer 15, serving for the operation of the x-ray diagnostic apparatus 1, for which reason the computer 15 is also connected to the x-ray source 8 in order to control it.

For registering projections from different projection angles α, the C-arm 7 together with x-ray source 8 and the detector 9 is moved along its circumference in the direction of the double arrow α through an angular range that is equal to 180° plus the fan angle γ (see FIG. 1) of the x-ray beam.

Figure 3:
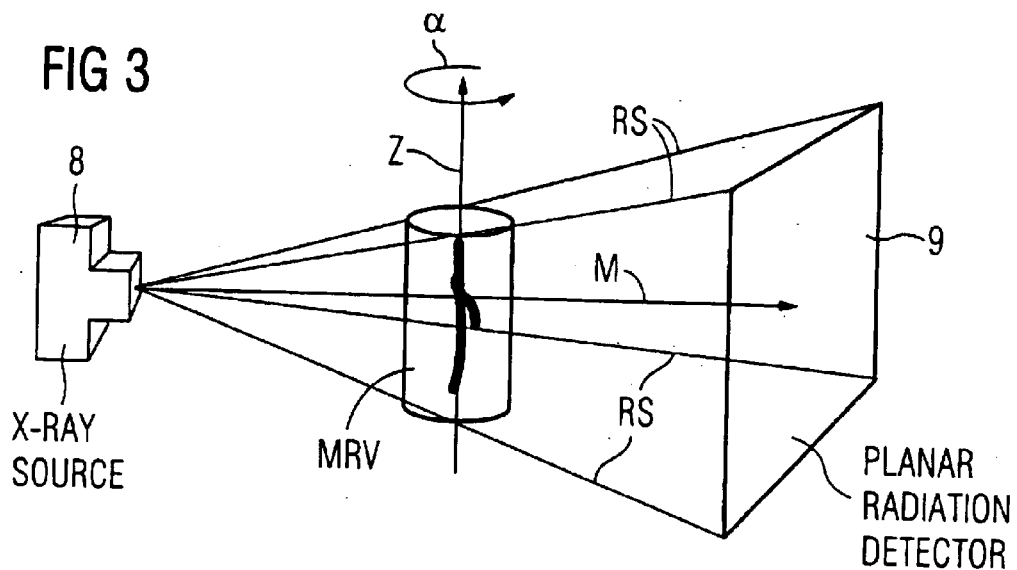
FIGS. 3 through 5 are schematic diagrams illustrating the imaging geometry of the x-ray diagnostic apparatus according to FIGS. 1 and 2.

When, as in the exemplary embodiment, the detector 9 has a rectangular shape, the MRV according to FIG. 3 (wherein the C-arm 7 is not shown) can be considered as a matter circular cylinder in a good approximation. The cylinder has a central axis corresponding to the rotational axis of the C-arm 7, thus to the z-axis of the global coordinate system, and thus to the system axis Z.

Two embodiments of the x-ray diagnostics apparatus according to FIGS. 1 and 2 based on different versions of the inventive method are described below, which allow the selection of a VOI line within the MRV with respect to which the computer 15 reconstructs 3D image data:

Both operating modes are based on the following, common procedure after registration of the required 2D central projections:

the user places the x-ray diagnostic apparatus 1 into a selection mode for the selection of a VOI;

two windows are opened next to one another on the monitor 17.

The two selected 2D central projections, for example those for $\alpha_1=0°$ and $\alpha_2=90°$, that were registered at the projection angles $\alpha_1$ and $\alpha_2$, are now respectively presented in each of these windows.

A mark in the form of a rectangle that corresponds to the position and the size of a selected VOI having the shape of a cuboid is mixed into these 2D central projections.

The position and size of mark in each of the two windows can be modified with a graphic input device, referred to as a picking device, for example the mouse 19, and the size and position of the mark in the other 2D central projection is correspondingly automatically adapted; the mixing of the mark and the automatic adaptation are undertaken by the computer 15 based on the modifications undertaken with the mouse 19.

In the first embodiment, which operates on the basis of an ideal geometry that is described below and that would only be established given complete mechanical stability, the cuboid VOI has the shape of a quadratic column whose quadratic end faces should have limiting edges proceeding parallel to the x-axis and y-axis. The height of the column is variable in the z-direction.

Figure 5:
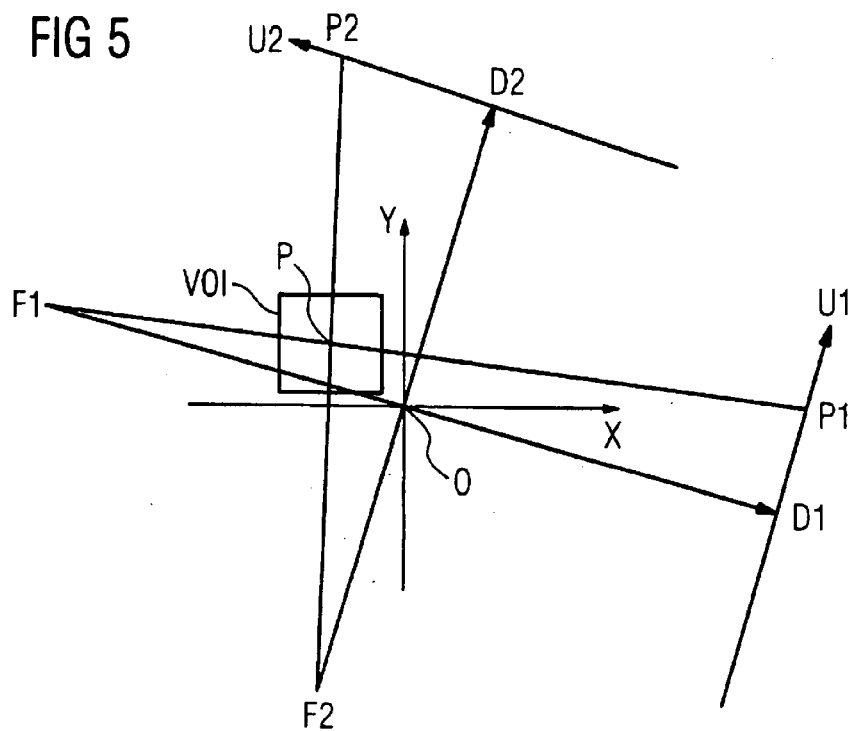

FIG. 5 shows a view in the direction of the z-axis of the global coordinate system. In addition to the origin O thereof, x-axis and y-axis, the base area of the column corresponding to the VOI as well as the positions F1, F2 of the focus of the x-ray source 1 for the two projection angles $\alpha_1$ and $\alpha_2$, the positions D1 and D2 of the detector 9, and the position u1 and u2 of the u-axis as well as M1 and M2 of the central ray M are also shown. The corresponding projections P1 and P2 are also shown for the intersection P of body diagonals of the quadratic column and thus of the VOI. In the case of the ideal geometry forming the basis for ths embodiment, the detector plane is at a right angle relative to the xy-plane for arbitrary detector positions. Likewise for arbitrary detector positions, the u-axis of the coordinate system referenced to the detector 9 is parallel to the xy-plane, and the v-axis of the coordinate system, as already mentioned, is parallel to the z-axis, and thus perpendicular on the plane of the drawing of FIG. 5.

Figure 4:
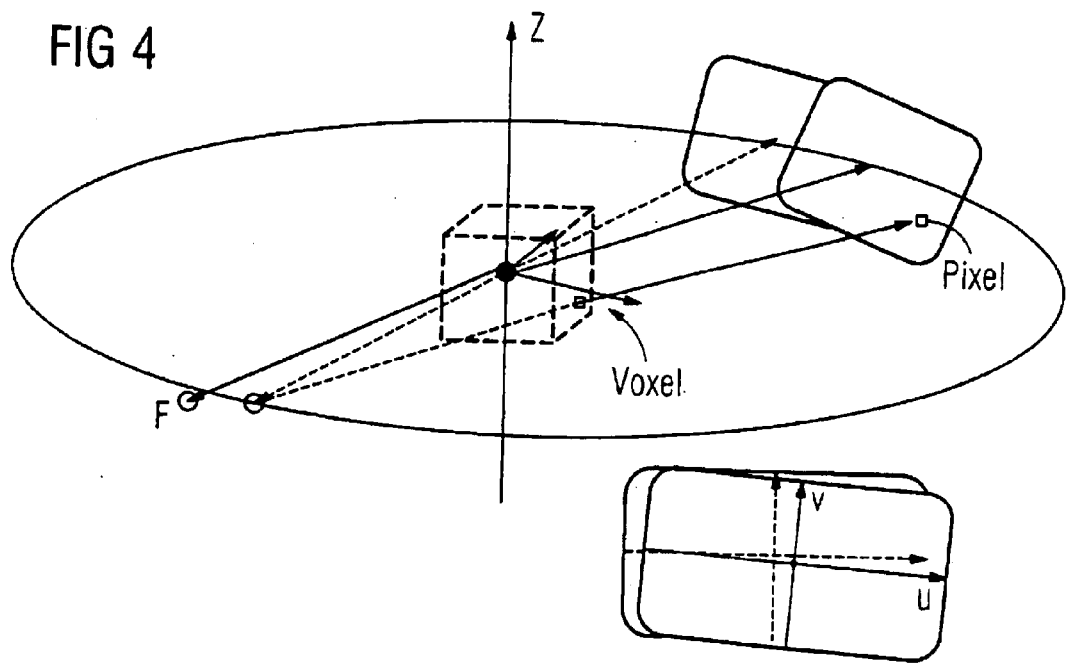

Given a geometry disturbed as a result of mechanical instabilities, in contrast, the detector 9—as shown in FIG. 4—is differently tilted in the individual detector positions relative to the system axis Z under certain circumstances. In many practical instances, the mechanical instabilities of the C-arm 7, however, are so slight that one can assume the described, ideal geometry.

Figure 6:
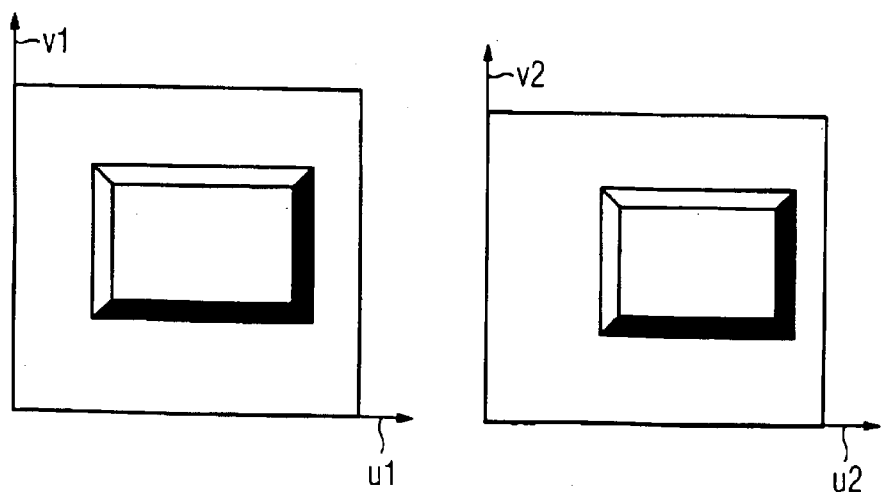
FIGS. 6 and 7 show 2D central projections displayed by the x-ray diagnostic apparatus according to FIGS. 1 and 2 for the selection of a volume of interest, whereby a test phantom is examined in the case of FIG. 6 and a patient is examined in the case of FIG. 7.

When the limiting edges of the column illustrating the VOI are imaged onto the detector surface in a central projection for the two detector positions D1 and D2 having the focus positions F1 and F2 as projection centers, then the illustrations according to FIG. 6 derive when the detector surface is viewed in the direction of the respective central ray.

Figure 7:
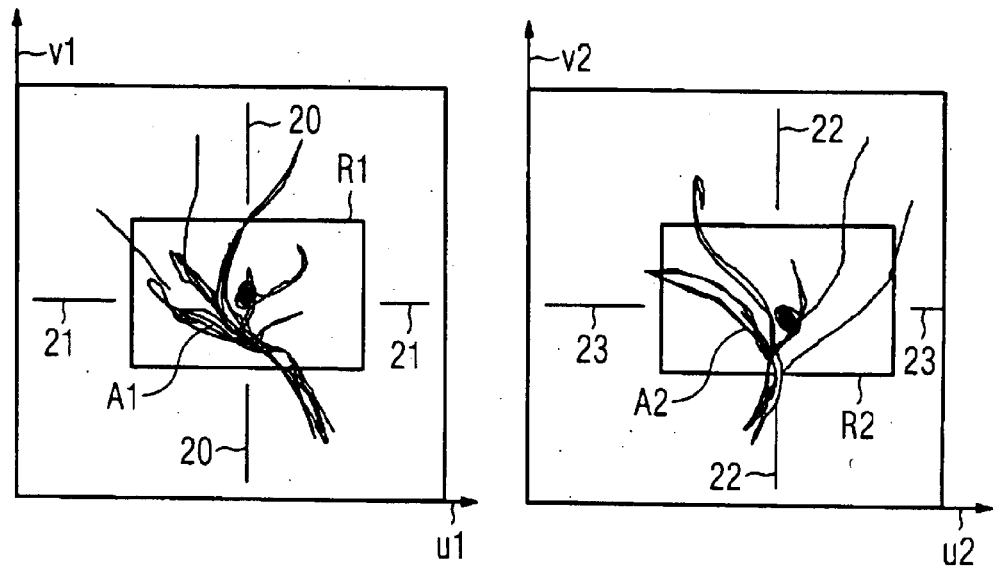

It would then be conceivable for identifying a VOI to mix the markings corresponding to the illustrations deriving according to FIG. 6 into the 2D central projections displayed for the selection of a VOI. Since, however, a VOI is a virtual volume that, in and of itself, cannot be imaged with "front" and "back" base areas anyway in 2D central projections registered with x-rays, rectangular marks R1 and R2 are mixed in instead as shown in FIG. 7. These are 2D central projections of the sectional plane of the quadratic column as an image of the VOI in a plane proceeding parallel to the xy-plane through the intersection P of the body diagonals of the quadratic column that images the VOI onto the detector positions D1 and D2.

Of the two marks R1 and R2, one can be freely positioned in alternation and freely defined in terms of its size. Given the prescription of a quadratic base area of the VOI, thus, only one degree of freedom remains for the other mark, namely its position in u-direction. When this is modified, this has a reaction on the mark in the first 2D central projection according to the projection laws of central projection, at least via the magnification factor. Given a variation of the size of the first mark and/or given displacement of the first mark in the direction of the u-axis and/or v-axis, the second mark is continuously modified according to the projection laws of central projection.

Due to the employment of rectangular marks R1 and R2 for identifying the VOI, it is easily possible to assure that 3D image data can be reconstructed for the region of the examination subject critical for the respective examination, by positioning and dimensioning the marks R1 and R2 such that the critical part (for example, organ) of the examination subject lies in the middle of the mark R1 or R2 in both 2D central projections.

This is facilitated by allocating reticules to the marks R1 and R2, reticules H1 (20, 21 in FIG. 7) and H2 (22, 23 in FIG. 7), which are arranged such that the intersection of the reticule lines corresponds to the image of the intersection P of the body diagonals of the quadratic column representing the VOI in the respective 2D central projection. These intersections, however, are not shown in the 2D central projections since the reticule lines are interrupted so that they are not visible within the markings R1 and R2. This measure is undertaken in order to avoid disturbances of the presentation of the central region of the 2D central projections and, thus, to avoid the need for a corrective selection of VOI.

When the user has marked a VOI in the described way, the user can bring the x-ray diagnostics apparatus 1 into the reconstruction mode wherein 3D image data for the selected VOI are reconstructed and displayed in the desired way on the monitor 17.

In the reconstruction mode, the edge lengths Lx, Ly and z (for example, in millimeters) of the cuboid VOI defined by the marks R1 and R2 are taken into consideration as initial parameters: $Lx=Nx*dx$, $Ly=Ny*dy$, $Lz=Nz*dz$. Before the beginning of the reconstruction, the user can optionally prescribe either the edge length of a voxel or the number of voxels—in every dimension (x, y and z direction)—that the cuboid has in the direction of the respective edge. The computer 15 calculates the non-prescribed parameter from the prescribed parameter. The user is offered both options because each has its advantages and disadvantages (for example, constant data volume, i.e. number of voxels, versus constant voxel size).

A second embodiment of the invention differs from that described above in that the selection of a VOI, and the subsequent reconstruction of 3D image data with respect thereto, are not based on an ideal geometry but on the actual geometry influenced by mechanical instabilities. The actual geometry ensues from the aforementioned projection matrices that are described in N. Navab et al., op. cit.

These matrices completely describe the allocation of an arbitrary subject point to its image point on the detector plane:

$$\begin{pmatrix} u \\ v \\ 1 \end{pmatrix} = \kappa \cdot P \begin{pmatrix} x \\ y \\ z \\ 1 \end{pmatrix}$$

wherein (x, y, z) are thereby the coordinates of a subject point in the global coordinate system, for example, in mm, (u, v) are the coordinates of its image point in the detector coordinate system, usually in the units of row number and column number. The 3×4 matrix P describes not only the geometrical imaging (in uniform coordinates) but also automatically produces the change of units between the coordinate systems. The direct result of the matrix multiplication is a three-element vector that must still be normalized so that its third component yields 1. The scaling factor K in imaging equations of this type thus does not reference a constant but stands for the normalization of the result of the matrix multiplication. When a quadratic detector having $n_{image}$ rows and $n_{image}$ columns is assumed, then it must be valid for all points within the MRV that the respective image points for all projection matrices, i.e. all measured projections, assume respective coordinate values between 1 and $n_{image}$, i.e. that real measured values respectively correspond to them. The projection matrices are defined in an extra calibration procedure that is not the subject matter of this application. The global coordinate system is usually defined by the calibration procedure and is no longer system-related/patient-related. In particular, the zero point of the global coordinate system can lie at a large distance from the isocenter (Point I in FIGS. 1/2) of the apparatus. A 3D reconstruction is possible by direct employment of these projection matrices. Physical parameters such as, for example, the position of the focal spot, distance of the focus from detector, pixel size on the detector, etc., are unknown but are also not required. For the reconstruction, position and size of the volume to be reconstructed must be known in global coordinates. In this case, however, this has no reference to the apparatus/patient and is unknown to the user/physician, in contrast to the image content of the individual projection exposures. The goal of this second embodiment is to define a VOI within the MRV only from the images and the appertaining projection matrices. Simplified, a regular cuboid having a mid-point $(x_M, y_M, z_M)$ and a number of voxels $n_{cube}$ as well as a voxel size $s_{vx}$ is again defined in all three dimensions from two projections. For further simplification of the mathematical equations, it is also assumed that the image plane of the first image (0° projection) is parallel to the yz-plane, and the image plane of the second image (90° projection) proceeds parallel to the xz-plane. No assumptions whatsoever are made with respect to the coordinate origin.

The interactive selection of the VOI then has the following features:

An initial VOI in the form of a cube having the edge length $n_{cube}$=Nx=Ny=Nz is assumed, and the position and size thereof are selected such that the cube lies within the MRV and is centrally completely imaged in both projection images. The calculation of this initial VOI ensues in a two-stage initialization and is described below.

The user can modify this cube in terms of its size and position with the mouse 19, with the selected position being described by the coordinates $(x_M, y_M, z_M)$ of the mid-point of the cube, equivalently by the picture elements thereof $(c1_y, c1_z)$ and $(c2_x, c2_z)$ in the two projection images, and the size is subscribed by the plurality $n_{cube}$ and the voxel size$_{SVX}$ of the voxels forming the cube.

As initial value for potential, further modifications, the user is respectfully presented with the most recently identified VOI in the form of a cube having a current voxel size$_{SVX}$, the mid-point thereof having the coordinates $(x_M, y_M, z_M)$ in the world coordinate system. The squares corresponding to the projections of the middle planes of this cube are shown to the user as marks of the VOI.

The squares shown as marks of the VOI have the following image coordinates in the two 2D central projections belonging to the projection angles $\alpha 1=0°$ and $\alpha=90°$:

1. Projection angle $\alpha 1=0°$: (y-z-plane)

Mid-point
$$\begin{pmatrix} c1_y \\ c1_z \\ 1 \end{pmatrix} = \kappa \cdot P_0 \begin{pmatrix} x_M \\ y_M \\ z_M \\ 1 \end{pmatrix}$$

Upper left corner:
$$\begin{pmatrix} u_1 \\ v_1 \\ 1 \end{pmatrix} = \kappa \cdot P_0 \begin{pmatrix} x_M \\ y_M - \dfrac{n_{cube}}{2} s_{vx} \\ z_M - \dfrac{n_{cube}}{2} s_{vx} \\ 1 \end{pmatrix}$$

Lower right corner:
$$\begin{pmatrix} u_2 \\ v_2 \\ 1 \end{pmatrix} = \kappa \cdot P_0 \begin{pmatrix} x_M \\ y_M + \dfrac{n_{cube}}{2} s_{vx} \\ z_M + \dfrac{n_{cube}}{2} s_{vx} \\ 1 \end{pmatrix}$$

2. Projection angle $\alpha 2=90°$: (x-y-plane)

Mid-point
$$\begin{pmatrix} c2_x \\ c2_z \\ 1 \end{pmatrix} = \kappa \cdot P_{90} \begin{pmatrix} x_M \\ y_M \\ z_M \\ 1 \end{pmatrix}$$

Upper left corner:
$$\begin{pmatrix} u_3 \\ v_3 \\ 1 \end{pmatrix} = \kappa \cdot P_{90} \begin{pmatrix} x_M - \dfrac{n_{cube}}{2} s_{vx} \\ y_M \\ z_M - \dfrac{n_{cube}}{2} s_{vx} \\ 1 \end{pmatrix}$$

Lower right corner:
$$\begin{pmatrix} u_4 \\ v_4 \\ 1 \end{pmatrix} = \kappa \cdot P_{90} \begin{pmatrix} x_M + \dfrac{n_{cube}}{2} s_{vx} \\ y_M \\ z_M + \dfrac{n_{cube}}{2} s_{vx} \\ 1 \end{pmatrix}$$

The four quantities $x_M, y_M, z_M, s_{vx}$ (mid-point coordinates of the reconstruction cube with respect to the global coordinate system underlying the projection matrices Po and P90, and the voxel size) are influenced by the shift of the squares, or their scaling, so that a constant refreshing of the presentation must ensue. For example, a shift of the square in the left image in x-direction effects a magnification/demagnification of the window in the right image.

As a simplification, only the specific instance of a cube as the reconstruction is considered here; expansion to an arbitrary cuboid can then easily be undertaken by those skilled in the art.

Given a fixed $n_{cube}$, for example $n_{cube}=256$, initial values for the four parameters must first be calculated on the basis of the two projection matrices ($P_0$ and $P_{90}$). This occurs in a two-stage initialization calculation:

Initialization I

One begins with the definition of a cube centered in the world coordinate system and images this into the detector plane:

$$x_M = y_M = z_M := 0, \; s_{vx} := 0.4 \text{ (or arbitrary other value)} \quad (1)$$

Imaging of the origin:

$$\begin{pmatrix} p_{yM} \\ p_{zM} \\ 1 \end{pmatrix} = \kappa \cdot P_0 \begin{pmatrix} x_M \\ y_M \\ z_M \\ 1 \end{pmatrix} \quad (2)$$

This cube may possibly lie far outside the MRV, i.e. the image coordinates may possibly not correspond to any measured positions on the detector. Nonetheless, the length of the diagonals of the image thereof can be calculated from the imaging of the middle square of the cube (yz-plane) in detector units (number of pixels):

$$\Delta_{p1} = \left\| \kappa \cdot P_0 \cdot \begin{pmatrix} x_M \\ y_M - \frac{n_{cube}}{2} s_{vx} \\ z_M - \frac{n_{cube}}{2} s_{vx} \\ 1 \end{pmatrix} - \kappa \cdot P_0 \cdot \begin{pmatrix} x_M \\ y_M + \frac{n_{cube}}{2} s_{vx} \\ z_M + \frac{n_{cube}}{2} s_{vx} \\ 1 \end{pmatrix} \right\| \quad (3)$$

The following scaling factor (conversion of pixels into mm; simultaneously, scaling factor for presentation of left image) derives therefrom:

$$\lambda_1 = \frac{\sqrt{2} \cdot n_{cube} \cdot s_{vx}}{\Delta_{p1}} \quad (4)$$

The cube is then shifted such that its mid-point is subsequently imaged onto the image middle of the first projection. The following derives therefrom for the new cube mid-point coordinates:

$$\bar{y}_M = y_M + \lambda_1 \cdot \left( \frac{n_{image}}{2} - p_{yM} \right) \quad (5)$$

$$\bar{z}_M = z_M + \lambda_1 \cdot \left( \frac{n_{image}}{2} - p_{zM} \right) \quad (6)$$

An analogous procedure with $P_{90}$ with determination of $\Delta_{p2}$ and $\lambda_2$ given use of the quantities $\bar{y}_M$ and $\bar{z}_M$ instead of the initial values $y_M=0$ and $z_M=0$ leads to the calculation of $\bar{x}_M$:

$$\bar{x}_M = x_M + \lambda_2 \cdot \left( \frac{n_{image}}{2} - p_{xM} \right) \quad (7)$$

Initialization II

The cube is now positioned such that it is presented centrally in the image in both projections. Due to the arbitrarily defined voxel size $s_{vx}$, however, the edges of the cube may possibly not be visible since they lie outside the projection images or the cubes are shown far too small.

The last quantity to be calculated is now a voxel size $s_{vx}$ such that the cube is displayed in a meaningful size in both projections. To that end, a desired edge length $n_{window}$ is defined in pixels for both displayed images, for example, $n_{window}=n_{image}/2$, and the appertaining, suitable voxel size is calculated therefrom:

$$\bar{s}_{vx}^{(1)} = \frac{\sqrt{2} \cdot n_{window} \cdot s_{vx}}{\Delta_{p1}}$$

$$\bar{s}_{vx}^{(2)} = \frac{\sqrt{2} \cdot n_{window} \cdot s_{vx}}{\Delta_{p2}}$$

So that both windows (left and right image) can be initially displayed, it is recommendable to use the lower value for the initialization.

Examples of standard values of the additional parameters are:

$n_{image}:=512$
$n_{window}:=256$
$n_{cube}:=256$

After the VOI has been initially placed in the global coordinate system, it can now be interactively modified by the user. When the user displaces the square in one of the two illustrated images, then the parameters for $y_M/z_M$, or $x_M/z_M$, are adapted according to equations 5 through 7 and the presentation for the two images is refreshed—a scaling (possibly hardly visible) ensues for the other image. When a square is scaled, then this likewise has an effect on the other image (new scaling).

The elementary manipulations are described in greater detail, whereby it must be noted that the edge length of the cube is given only by the product $n_{cube} * s_{vx}$, i.e. can be influenced by modifying each of these two quantities.

1. Shifting the cube:

This manipulation leads to a modification of the reconstruction parameters ($x_M$, $y_M$, $z_M$) cube mid-point coordinates. Further, the scaling for the presentation of the cube changes in the respectively other projection image (scaling). Let the square in the first projection image be displaced, for example, by $d_u$ pixels in the direction of the u-axis and by $d_v$ pixels in the direction of the v-axis. This shift can be converted with the assistance of the scaling factor $\lambda$ into a shift of the cube (in mm):

$z_{Mnew} = z_{Mold} + \lambda_1 * d_u$ $y_{Mnew} = y_{Mold} + \lambda_1 * d_v$

These values are inserted into the equations for the imaging of the cube and the presentation is refreshed in both projection images. Moreover, the two scaling factors $\lambda_1$ and $\lambda_2$ are recalculated. The voxel plurality $n_{cube}$ and the voxel size $s_{vx}$ remain unaffected by this manipulation. A shift of the square in the second projection image ensues analogous to the procedure that was just described.

2. Modification of the cube size by modifying the voxel plurality:

The variation of the size of the illustrated square thereby effects a change of the initially defined voxel plurality $n_{cube}$, whereas the voxel size $s_{vx}$ is kept constant. When—dependent on implementation—the mid-point of the cube is also simultaneously shifted, a modification of the reconstruction parameters as described in the preceding point 1 additionally ensues. An enlargement of the square in the first projection image by d pixels corresponds to an enlargement of the reconstruction cube by k voxels. The following is valid:

$$k=\lambda_1 * d/s_{vx}$$

An analogous procedure is employed for a variation in the second image.

3. Variation of the cube size by modifying the voxel size:

In this manipulation, the volume to be reconstructed is modified without thereby modifying the plurality of voxels $n_{cube}$ by instead modifying the voxel size $s_{svx}$. When the square is enlarged by d pixels in the first projection image, then this corresponds to an enlargement of the reconstruction cube by $\lambda_1 * d$ mm. Since the plurality of voxels should remain constant, the new quantity is calculated as:

$$s_{vxnew}=(s_{vxold} * n_{cube}+\lambda_1 * d)/n_{cube}$$

When a shift of the cube mid-point also occurs due to the implementation of this function, then this must be recalculated according to the calculating rule of point 1.

In both exemplary embodiments, the VOI need not necessarily have a quadratic base area. For a non-quadratic base areas of the column representing the VOI, orthogonal projections should be used for the purpose of a clean definition of the subject base area, as should a defined reference to the x-axis and y-axis of the global coordinate system (for example, D1 and D2 respectively parallel to an axis). Otherwise, a more differentiated calculation would be necessary. An elegant method (circular cylinder as VOI) of avoiding these limitations is described below.

Options also can be provided in the reconstruction mode that allows [sic] the setting of the voxel size, and thus of the topical resolution, isotropically or anistropically.

Given the above-described procedure using the 2D central projections belonging to the projection angles $\alpha 1=0°$ and $\alpha 2=90°$, the perspective imaging of the two parallel middle planes of the quadratic column corresponding to the VOI and orthogonal to the z-axis are considered. This is only a specific influence of a more general approach wherein the VOI is defined as a circular cylinder whose middle axis proceeds parallel to the z-axis and whose end faces proceed parallel to the xy-plane. This circular cylinder is defined by the following parameters:

r=Radius

PM=(xM, yM)=position of the axis (penetration point through the xy-plane)

Zu=z-position of the lower limiting plane

Zo=z-position of the upper limiting plane.

For an arbitrary 2D central projection, the position of the projection center (position of the focus of the x-ray source 8) is referenced S=(xs, ys, zs).

When the imaging geometry is described in physical, i.e. directly interpretable units, as in the first exemplary embodiment, then S is automatically known. Given implicit description of the geometry by projection matrices, S can be easily calculated. To this end, see Equation (3) from N. Navab et al, op. cit.

Let S0=(xs, ys) be the orthogonal projection of S onto the xy-plane.

Let d=|S0P0| reference the distance of S0 from P0 belonging to a detector position D0, i.e. the distance of the point S0 from the middle axis of the circular cylinder.

When the plane through P0 perpendicular to the connecting straight line of the projected focus position S0 is considered with P0, then the perspective image of a rectangle in this plane is employed as an image of the VOI on the detector 9. This has vertical edges parallel to the z-axis and horizontal edges parallel to the x-y-plane that lie at z=Zu and z=Zo. The breadth expanse of the rectangle is selected symmetrical to the cylinder axis and is established in the xy-plane by two points Q1=(xq1, yq1) and Q2=(xq2, yq2). Given a rectangle breadth of 2b, the following relationship is valid for the coordinates of the two edge points Q1, 2:

$$xq1,2=xM \pm b*(yM-ys)/d$$

$$yq1,2=yM \pm b*(xs-xM)/d$$

The most standard occupations for b are b=r and b=r'; however, the value can also be expanded by a safety threshold.

Figure 8:
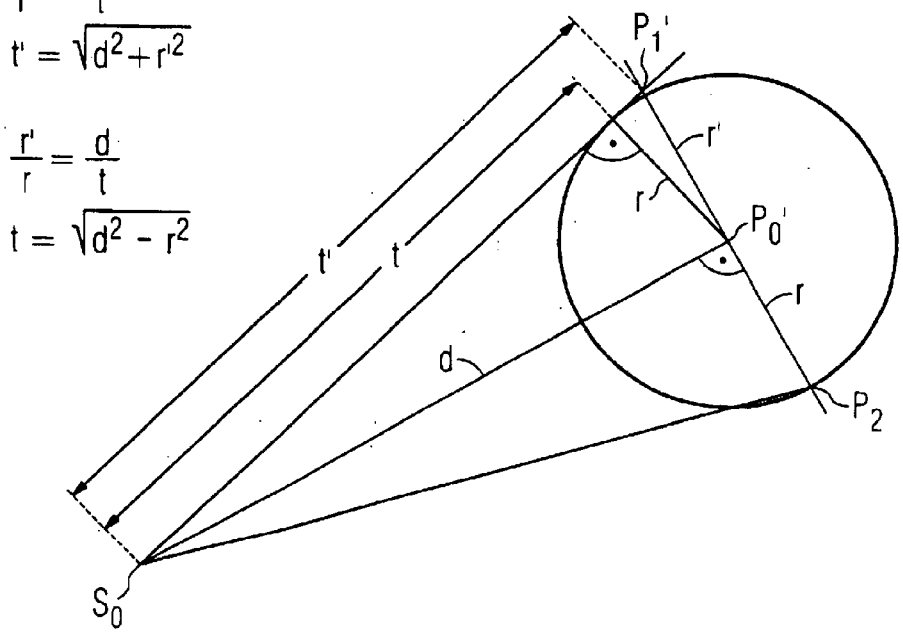
FIG. 8 is another schematic diagram for illustrating the selection of a volume of interest in the rotational plane in the inventive method.

The geometrical conditions are illustrated in FIG. 8. The conditions b=r' are shown above the symmetry axis S0P0 and the conditions for b=r are shown under the symmetry axis S0P0.

A value b=4 corresponds to the selection Q1=P1 and Q2=P2 (lower half of FIG. 8; P1 not shown). A small part of the VOI (shaded circular segment in FIG. 8) is shown as lying outside the VOI. Given the present geometrical conditions, however, this can be left out of consideration. This also allows for a margin of error, since if the user sees an interesting detail outside the indicated boundary, then, of course, the user enlarges the radius r or changes the position of the central axis of the circular cylinder. When the full circular cylinder is to be imaged, then b=r' is selected, i.e. Q1=P1' and Q2=P2' (P2' is not shown in FIG. 8). P1' and P2' are the intersections (lying in the xy-plane) of the tangent proceeding from S0 at the circular cylinder with the plane of the rectangle. R and r' can be easily converted into one another.

When a circular cylindrical VOI is selected in the way described above, the number and projection directions of the 2D central projections on which the selection is based can be arbitrarily selected.

In contrast to the above-described procedures, 3D image data are not reconstructed only with respect to the selected VOI, but also with respect to a cuboid containing the circular cylindrical VOI whose edges proceed parallel to the axes of the global coordinate system this is preferably a quadratic column. The cuboid, optionally, can be of minimal size, i.e. it is tangential with the circular cylinder, or, corresponding to a variable safety margin, can be selected slightly larger than the circular cylinder. Given this procedure, the described cuboid in fact usually lies within the MRV; however, it is also possible that some voxels of the cuboid, particularly in the proximity of the edges, lie not only outside the selected, cylindrical VOI but even lie outside the MRV. However, such voxels can be recognized as such in the reconstruction and can be correspondingly marked, for example by occupation with zero.

In both exemplary embodiments, the user can, if desired, place the x-ray diagnostics apparatus 1 into a monitoring mode before switching into the reconstruction mode, individual, some, or all registered 2D central projections can be selected therein in addition to the 2D central projections employed in the selection mode, whereupon the computer also mixes the marks corresponding to the selected VOI into the additionally selected 2D central projections.

The selection of additional 2D central projections can ensue with the mouse 19, for example by the user scrolling the 2D central projections shown on the monitor 17 and identifying those that the user wishes to additionally select with mouse clicks, whereupon the mixing of the corresponding mark ensues. In order to obtain an overview of the selected VOI on the basis of the 2D central projections employed in the selection mode as well as additionally selected in the monitoring mode, the user can switch into a cine mode within the monitoring mode wherein the 2D central projections containing the marks are presented on the monitor as a cine replay in the manner of a motion picture.

The user can then easily see whether the respective region of interest of the examination subject, for example an aneurism referenced A1 or A2 in FIG. 7, is located in one of the 2D central projections outside the VOI. When this is the case, the user can switch back into the selection mode and correct the selection of the VOI that was undertaken.

In both exemplary embodiments, likewise, the user has the option in the reconstruction mode of selecting between minimum artifacts and maximum speed. In the former instance, the complete data of all 2D central projections are taken into consideration in the reconstruction of the 3D image data; in the latter, there are only those sub-data of the individual 2D central projections that are absolutely required for the reconstruction of 3D image data with respect to the VOI.

It should be noted that the intersection P of the straight lines F1_P1 and F2_P2 (FIG. 5) represents the intersection of the body diagonals of the quadratic column corresponding to the VOI that represents the mid-point of the VOI in global coordinates, whose coordinates can be determined in the global coordinate system. The size of the VOI is derived from du and dv increments of the detector, projected back into the detector-parallel plane through the origin O of the global coordinate system and referenced to the desired, displayed edge length of the VOI, expressed in pixels. The sub-data required with respect to the VOI for the reconstruction of 3D image data are determined in that a factor having the size $\sqrt{2}$ plus a certain safety margin is imposed on the widths of the orthogonal, detector-parallel projections. The factor has the size $\sqrt{2}$ because of the longer diagonals of the quadratic base area that represents the width of the VOI in the 2D central projection given $\alpha=45°$.

The described procedure also can be rewritten as a section of the two planes that proceed through Fi, Pi and z (i=1 or 2). It can be fundamentally applied for arbitrary angular differences of $\alpha1$ and $\alpha2$ as long as the difference amounts to at least 5°.

In the case of FIGS. 1 and 2, the movement of the x-ray source 8 and of the detector 9 for registering the 2D central projections ensues around an axis proceeding parallel to the longitudinal axis of the support plate, or parallel to the physical longitudinal axis of the patient. Alternatively, this movement can ensue within the scope of the invention around a different axis, for example around an axis that proceeds transversely relative to the longitudinal axis of the support plate or to the physical longitudinal axis of the patient.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for reconstructing 3D image data representing a volume of interest of an examination subject, comprising the steps of:
    (a) irradiating an examination subject with x-rays from a radiation source from a plurality of different projection directions, and receiving radiation attenuated by the examination subject with a planar detector, to acquire a plurality of 2D central projections respectively from said different projection directions without any 3D reconstruction;
    (b) displaying at least two of said 2D central projections, including a first central projection and at least a second 2D central projection, on a display screen;
    (c) marking a contour of a volume of interest in said first central projection on said display screen and mixing a mark identifying said contour into said first 2D central projection displayed on said display screen;
    (d) mixing a mark into said second 2D central projection on said display screen indicating the contour identified by the mark mixed into the first 2D central projection; and
    (e) reconstructing 3D image data of said volume of interest corresponding to the respective contours marked in said first and second 2D central projections, using said plurality of 2D central projections.

2. A method as claimed in claim 1 comprising the step of modifying one of the respective marks in said first and second 2D central projections, as a first modified mark, and automatically mixing a second modified mark into the other of said first and second 2D central projections, which is adapted to said first modified mark.

3. A method as claimed in claim 1 wherein step (e) comprises employing only data from said plurality of 2D central projections to reconstruct said 3D image data which are required for reconstructing 3D image data of said volume of interest.

4. A method as claimed in claim 1 comprising selecting at least one additional 2D central projection from said plurality of 2D central projections and mixing a mark into said at least one additional 2D central projection corresponding to the contour of the volume of interest.

5. A method as claimed in claim 4 comprising displaying said first 2central projection, said second 2D central projection and said at least one additional central projection, each with said marks respectively mixed in, in succession.

6. A method as claimed in claim 1 comprising mixing respective marks into all of said 2D central projections corresponding to the contour of the volume of interest.

7. A method as claimed in claim 6 comprising successively displaying all of said 2D central projections with the respective marks mixed in.

8. A method as claimed in claim 7 wherein each of said rectangular marks is a reticule.

9. A method as claimed in claim 8 wherein each reticule has reticule lines which are interrupted in a central region of said reticule.

10. A method as claimed in claim 1 wherein step (c) comprises mixing a rectangular mark into said first 2D central projection and wherein step (d) comprises mixing a rectangular mark into said second 2D central projection.

* * * * *